Patented Dec. 5, 1922.

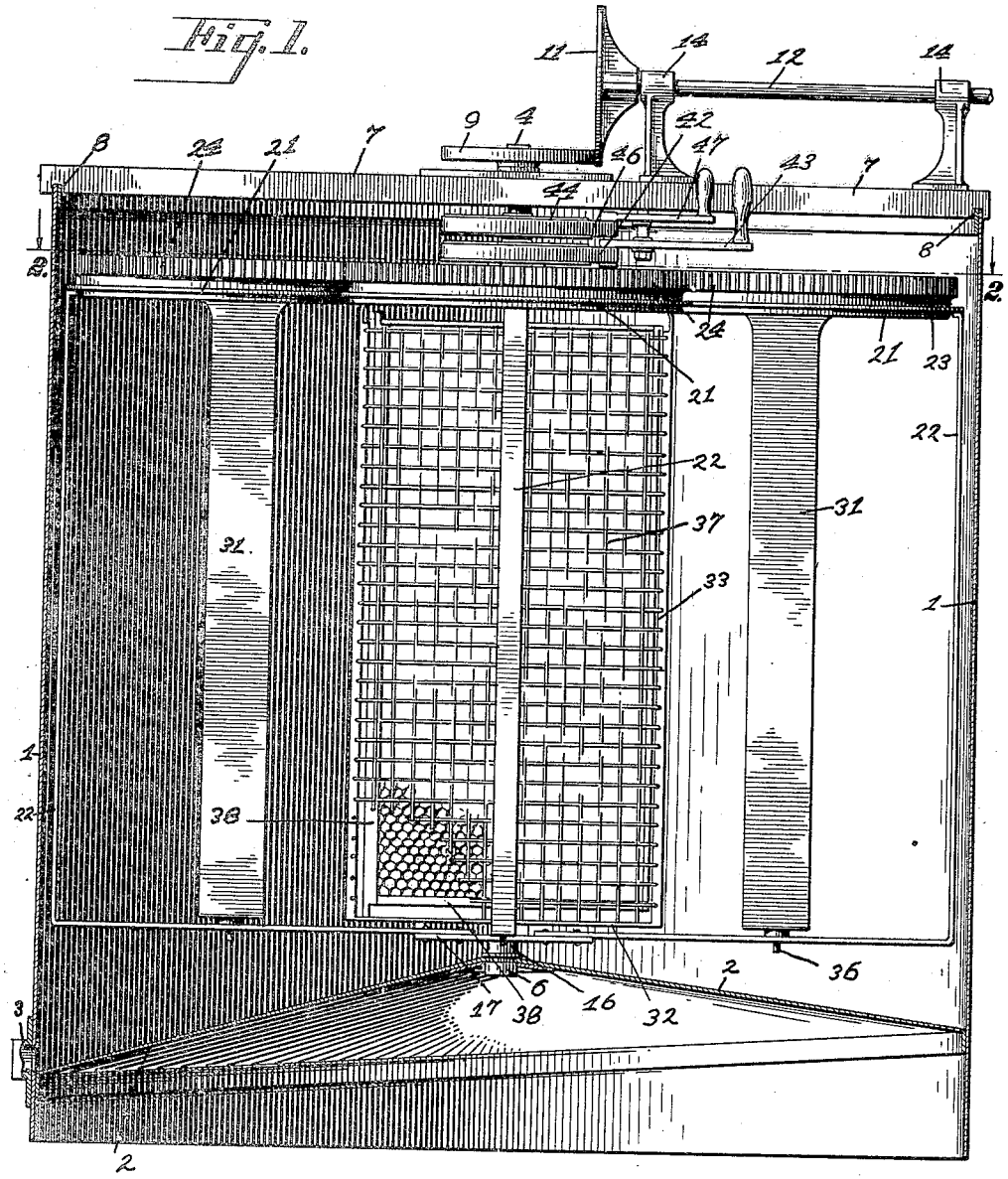

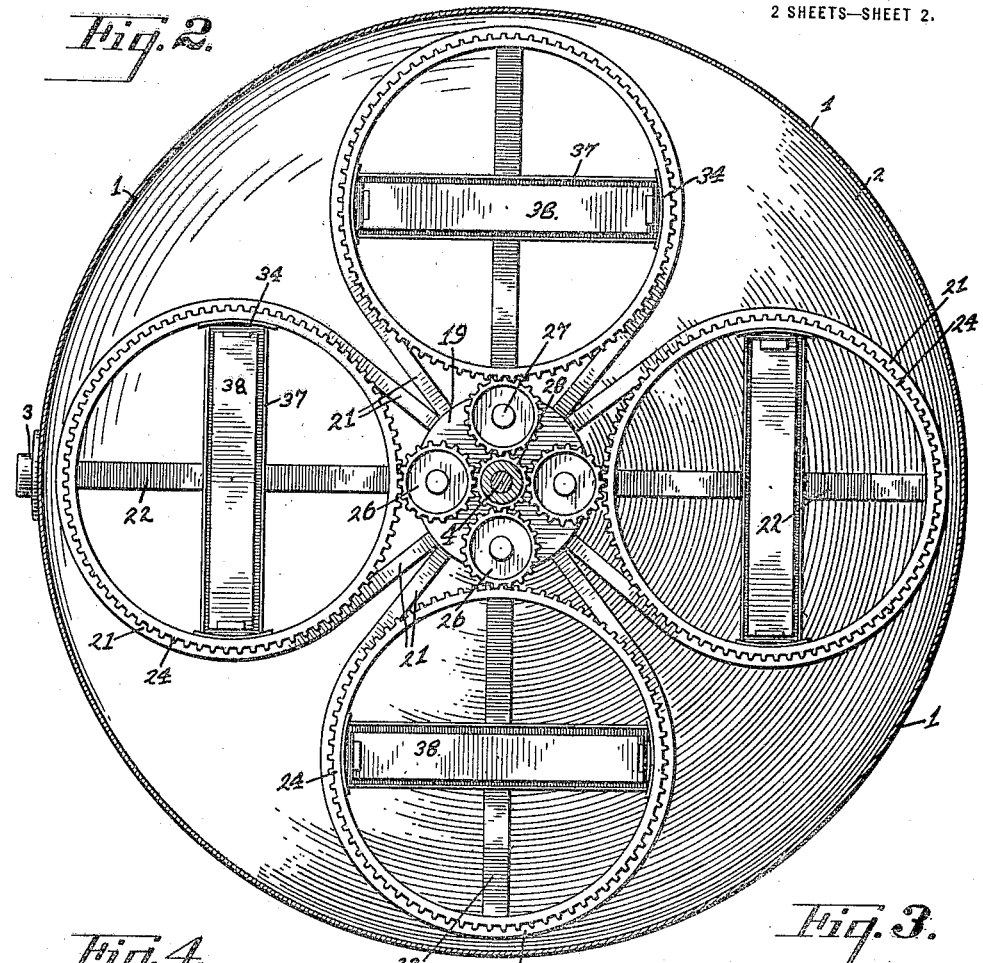
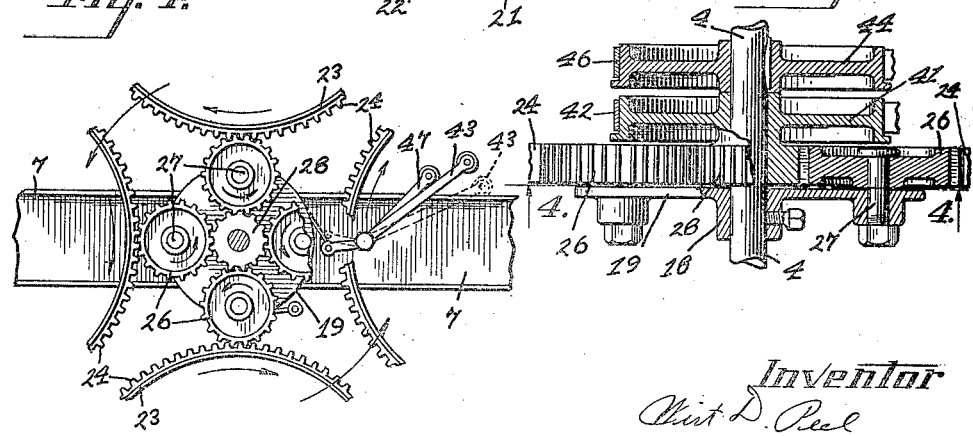

1,437,737

UNITED STATES PATENT OFFICE.

WIRT D. PEEL, OF SAN FRANCISCO, CALIFORNIA.

HONEY EXTRACTOR.

Application filed June 6, 1921. Serial No. 475,465.

*To all whom it may concern:*

Be it known that I, WIRT D. PEEL, a citizen of the United States, residing in the city and county of San Francisco, and State of California, have invented a new and useful Improvement in a Honey Extractor, of which the following is a specification.

My invention relates to improvements in honey extractors of the centrifugal type wherein honey comb frames may be revolved upon a rotating reel to reverse the comb without stopping the rotation of the reel.

The primary object of my invention is to provide an improved extractor for extracting the honey from honey combs by centrifugal force.

Another object of my invention is to provide improved means for reversing a honey comb frame during rotation to permit the extraction of honey from both sides of the comb.

A further object is to provide an improved honey comb retaining member arranged to be readily removed for cleaning.

A further object is to provide an improved construction adapted to permit easy access to all parts of the extractor to facilitate operation and cleaning.

I accomplish these and other objects by means of the device disclosed in the drawings forming a part of the present specification wherein like characters of reference are used to designate similar parts throughout said specification and drawings, and in which:

Fig. 1 is a vertical section of my improved honey extractor.

Fig. 2 is a horizontal section taken along the line 2—2 of Fig. 1 in the direction indicated.

Fig. 3 is an enlarged broken detail of my improved reversing pinion.

Fig. 4 is a broken detail disclosing the operation of my reversing means, the section being shown on a reduced scale as though taken along the line 4—4 of Fig. 3.

Referring to the drawings the numeral 1 is used to designate in general a receptacle open at the top and having a conical bottom 2 and provided with a suitable outlet 3. The bottom 2 is inclined to give the greatest depth adjacent the outlet 3 thereby insuring complete draining.

A shaft 4 is centrally mounted within the receptacle 1, the lower end of the shaft being mounted in a suitable bearing 6 at the apex of the conical bottom 2, and the upper end of the shaft 4 extending above the top of the receptacle through a transverse bar 7 having slots 8 arranged to engage the edges of the receptacle 1 for retaining the shaft 3 in central alignment. A suitable disc 9 is mounted upon the upper end of the shaft 4 and arranged to engage a friction driving disc 11 secured upon a horizontally disposed shaft 12 mounted upon the bar 7 by means of bearing brackets 14, the shaft 12 being operatively connected to any suitable source of power, not shown.

A hub 16 having a flange 17 is secured to the shaft 4 adjacent the lower bearing 6. A hub 18 having a flange 19 is secured to the upper portion of the shaft 4. A plurality of bands 21 having the outer portion circular in outline are secured to the flange 19 and L-shaped arms 22 and connected between the outer edge of the bands 21 and the flange 17 of the hub 16 to form a skeleton reel.

The circular portion of the bands 21 are shaped to receive flanges 23 formed upon gears 24 movably mounted therein and meshing with idler gears 26 rotatably mounted upon the flanges 19 of the hub 18 by means of bolts 27. The idler gears mesh with a pinion 28 rotatably mounted upon the shaft 4 the function of which will be hereafter more fully described.

Honey comb frame receiving members 31 comprising a U-shaped frame 32 shaped from sheet metal or other suitable material and having flanges 33 turned inwardly upon the sides thereof are provided with widened portions 34 at the top, said widened portions being adapted to fit into the inner surface of the flanges 23 of the gears 24 which I will hereinafter refer to as the reversing gears. A pin 36 is secured in central position upon the lower side of each frame 32 to engage an aperture in an arm 22 whereby the members 31 are revolvably mounted upon the reel, the upper portion of the members 31 being retained in operative position by the gears 24 engaged by the bands 21. A suitable screen 37 of relatively large mesh is secured upon the front and back of the U-shaped frame 32 between the flanges 33 to form a pocket adapted to receive a honey comb frame 38 from which the honey is to be extracted.

A brake hub 41 formed integrally with or secured to the pinion 28 rotatably mounted upon the shaft 4 is arranged to receive a brake band 42 operatively connected to a lever 43 whereby rotation of the hub 41 and the pinion 28 with the shaft 4 may be prevented for a purpose hereafter explained. A brake hub 44 is secured to the shaft 4 adjacent the hub 41 and arranged to receive a brake band 46 operated by a lever 47 whereby rotation of the shaft 4 may be retarded.

The operation of my invention is as follows:

The revolvable honey comb frame receiving members 31 each having a reversing gear 24 mounted upon the widened portion 34 of the frame 32 are placed in operative position upon the reel with the flanges 23 engaged by the bands 22 and the gear teeth in mesh with the idler gears 26 as above described. The wax is cut from both sides of honey combs in honey filled frames 38 and the frames 38 placed in the pockets of the members 31 in the position shown in Figs. 1 and 2 of the drawings. Power is now applied through the shaft 12 to rotate the reel at a high velocity, the centrifugal force created causing the honey within the cells upon the outer side of the honey comb to be thrown outwardly into the receptacle. As the pinion 28 is rotatably mounted upon the shaft 4 it will rotate freely with the shaft and reel, the relative positions of the pinion 28 the idler gears 26 and the reversing gears 24 remaining unchanged during rotation. When the honey has been thus extracted from the outer cells of the comb in the frame 38, the lever 43 is moved to cause a pressure to be applied upon the hub 41 by the brake band 42 thereby preventing rotation of the pinion 28 with the shaft 4. Rotation of the reel will now cause the idler gears 26 to rotate and the reversing gears 24 to be rotated within the bands 21 by the idler gears 26 until the members 31 engaged by the inner surface of the gears 24 have been moved through an angle of 180° thereby reversing the position of the members 31 and the frames 38 therein. The rotation of the gears 24 and 26 when the pinion 28 is held against rotation is indicated by arrows in Fig. 4 of the drawings. The brake lever 43 is now moved to release the brake thereby permitting free rotation of the pinion 28, and the extraction of the honey from the opposite side of the combs. In this manner the comb frames may be reversed at the pleasure of the operator without the necessity of stopping or slowing the rotation of the reel.

When the honey has been extracted from both sides of the comb as above explained the shaft 12 is released from the power by any suitable clutch not shown, and rotation of the reel retarded by operating the lever 47 to move the brake band 46 into contact with the hub 44. The frames 38 are now replaced with fresh ones and the operation repeated, the honey being withdrawn from the receptacle 1 through the outlet 3 during the operation.

The members 31 and gears 24 may be lifted away from the reel and removed from the receptacle for cleaning thereby removing all obstructions except the skeleton frame of the reel and permitting substantially free access for a thorough cleaning of the receptacle. The idler gears 26 are always in mesh with the pinion 28 and the bands 21 are shaped in such a manner that the members 31 and the gears 24 cannot be positioned without causing the gears 24 to mesh with the idler gears 26, in this manner obtaining a positive reversing connection.

Having thus described my invention what I claim as new and desire to secure by Letters Patent is:

1. A honey extractor comprising a receptacle; a reel mounted within the receptacle; means for rotating said reel; a plurality of revolvable members removably mounted upon the reel, each member being arranged to receive a honey comb frame; a gear removably engaging each revolvable member and the reel; gears connecting said removable gear with the reel rotating means, said gears being normally inoperative; and means for rendering said gears operative for partially revolving the revolvable member upon the reel to reverse the combs therein while said reel is being rotated.

2. A honey extractor comprising a receptacle; a reel mounted within the receptacle; a plurality of revolvable members removably mounted upon the reel, each member being arranged to receive a honey comb frame therein; a gear removably mounted upon each revolvable member in movable engagement with the reel; means for rotating the reel; gears connecting the removable gear with said rotating means, said gears being normally inoperative; and means for rendering said gears operative for partially revolving the revolvable member upon the reel for reversing the honey comb frames while said reel is being rotated.

3. A honey extractor comprising a receptacle; a shaft axially mounted within the receptacle; a reel secured to said shaft; a plurality of revolvable members removably mounted upon the reel, each member being arranged to receive a honey comb frame; a gear removably mounted upon each revolvable member in movable engagement with the reel; a pinion rotatably mounted upon the shaft; idler gears rotatably mounted upon the reel each idler engaging the pinion and a removable gear; means for rotating the shaft and reel; and means for holding the pinion against rotation with the shaft to cause the idlers rotating thereabout to revolve the removable gears and the revolvable members to reverse the honey comb frames therein while the reel is being rotated.

4. A honey extractor comprising a receptacle; a shaft axially mounted within the receptacle; a reel secured to said shaft; a plurality of revolvable members removably mounted upon the reel, each member being arranged to receive a honey comb frame; a gear removably mounted upon each revolvable member in movable engagement with the reel; a pinion rotatably mounted upon the shaft; idler gears rotatably mounted upon the reel, each idler engaging the pinion and a removable gear; means for rotating the shaft and reel; and means for holding the pinion against rotation with the shaft to cause the idlers rotating thereabout to revolve the removable gears and the revolvable members to reverse the honey comb frames therein while the reel is being rotated; and means for retarding rotation of the reel.

5. A honey extractor comprising a receptacle; a shaft vertically mounted within the receptacle; a reel secured to said shaft; a plurality of revolvable members removably mounted upon the reel, each member being arranged to receive a honey comb frame; a reversing gear removably mounted upon each revolvable member in movable engagement with the reel; a pinion rotatably mounted upon the shaft; idler gears rotatably mounted upon the reel in engagement with the pinion and a reversing gear; a brake operatively connected to the pinion for holding the same against rotation with the shaft to cause the idler gears rotating thereabout to operate the reversing gear to revolve the revolvable member thereby reversing the honey comb frame.

6. A honey extractor comprising a receptacle; a shaft axially mounted within the receptacle; a reel secured to said shaft; a plurality of revolvable members mounted upon the reel, each member being arranged to receive a honey comb frame; a gear mounted in connection with each revolvable member in movable engagement with the reel; a pinion rotatably mounted upon the shaft; idler gears rotatably mounted upon the reel, each idler engaging the pinion and one of the gears connected with the revolvable members; means for rotating the shaft and reel; and means for holding the pinion against rotation with the shaft and the reel to cause the idlers rotating thereabout to revolve the gears and revolvable members to reverse the honey comb frames therein while the reel is being rotated.

In witness whereof I hereunto set my signature.

WIRT D. PEEL.